(12) United States Patent
Guggenheim, Jr. et al.

(10) Patent No.: US 7,472,823 B1
(45) Date of Patent: *Jan. 6, 2009

(54) METHOD FOR ISSUING A PROMOTIONAL TICKET TO A SHOW

(75) Inventors: Alvin S. Guggenheim, Jr., Houston, TX (US); Alvin S. Guggenheim, III, Houston, TX (US); Hildred P. Guggenheim, Houston, TX (US)

(73) Assignee: Entertainment Printing Services, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,326

(22) Filed: Aug. 28, 2007

(51) Int. Cl.
 *G06F 17/00* (2006.01)
(52) U.S. Cl. ....................... 235/375; 235/382
(58) Field of Classification Search ................. 235/375, 235/380, 382, 385, 462.01, 462.45, 472
See application file for complete search history.

(56) References Cited

U.S. PATENT DOCUMENTS

| | | | |
|---|---|---|---|
| 6,959,286 B2 * | 10/2005 | Perkowski | 705/27 |
| 7,024,016 B2 * | 4/2006 | Rhoads et al. | 382/100 |
| 7,089,199 B2 * | 8/2006 | Perkowski | 705/27 |
| 7,164,780 B2 * | 1/2007 | Brundage et al. | 382/100 |
| 2007/0168485 A1 | 7/2007 | Dufour | |

\* cited by examiner

*Primary Examiner*—Daniel St. Cyr
(74) *Attorney, Agent, or Firm*—Buskop Law Group, PC; Wendy Buskop

(57) ABSTRACT

A method for issuing an invitation to a show and compiling demographic information comprising: forming an invitation-only, no-cost-to-attendee ticket website on a server comprising invitee information; using demographic information to select at least one invitee to receive a promotional ticket; transmitting the promotional ticket to a client device of the invitee; using the client device to display the ticket, wherein the promotional ticket comprises invitee information and at least one validation code; wirelessly transmitting the validation code to the server, thereby changing the at least one invitee to at least one invited attendee; comparing the validation code with the invitee information for the at least one invited attendee to authenticate the promotional ticket and track attendance of the at least one invitee; and storing the tracked attendance and the invitee information in data storage.

21 Claims, 3 Drawing Sheets

METHOD FOR ISSUING A PROMOTIONAL TICKET TO A SHOW

FIELD

The present embodiments relate generally to a method for issuing a promotional ticket to a show and compiling demographic information.

BACKGROUND

The present embodiments relate generally to an electronic system for facilitating the selection of persons to receive promotional tickets for a screening of a movie, a television show, a concert, a theatrical event, and other similar events.

Movie studios often encounter difficulty when attempting to obtain a suitable audience to screen a movie or other type of show for release. Typically, a promotion house is hired to print large quantities of promotional passes that are distributed at strategic public locations. Public distribution can be costly and inefficient, as many recipients of these promotional passes are not members of a targeted demographic group, and are unlikely to use the promotional passes.

Additionally, conventional promotional passes are subject to counterfeiting and other unauthorized duplication, which can skew carefully planned screenings, shows, and received demographic information.

A need exists for a method for issuing promotional tickets to a show that uses compiled demographic information to target selected individuals to receive promotional tickets, cheaply, effectively, and rapidly, thereby enabling target audiences to be reached on short notice.

A further need exists for a method for issuing promotional tickets to a show that incorporates an efficient, cost-effective means to authenticate each promotional ticket while simultaneously tracking and storing attendance information.

The present embodiments meet these needs.

BRIEF DESCRIPTION OF THE DRAWINGS

The detailed description will be better understood in conjunction with the accompanying drawings as follows.

Figure 1:
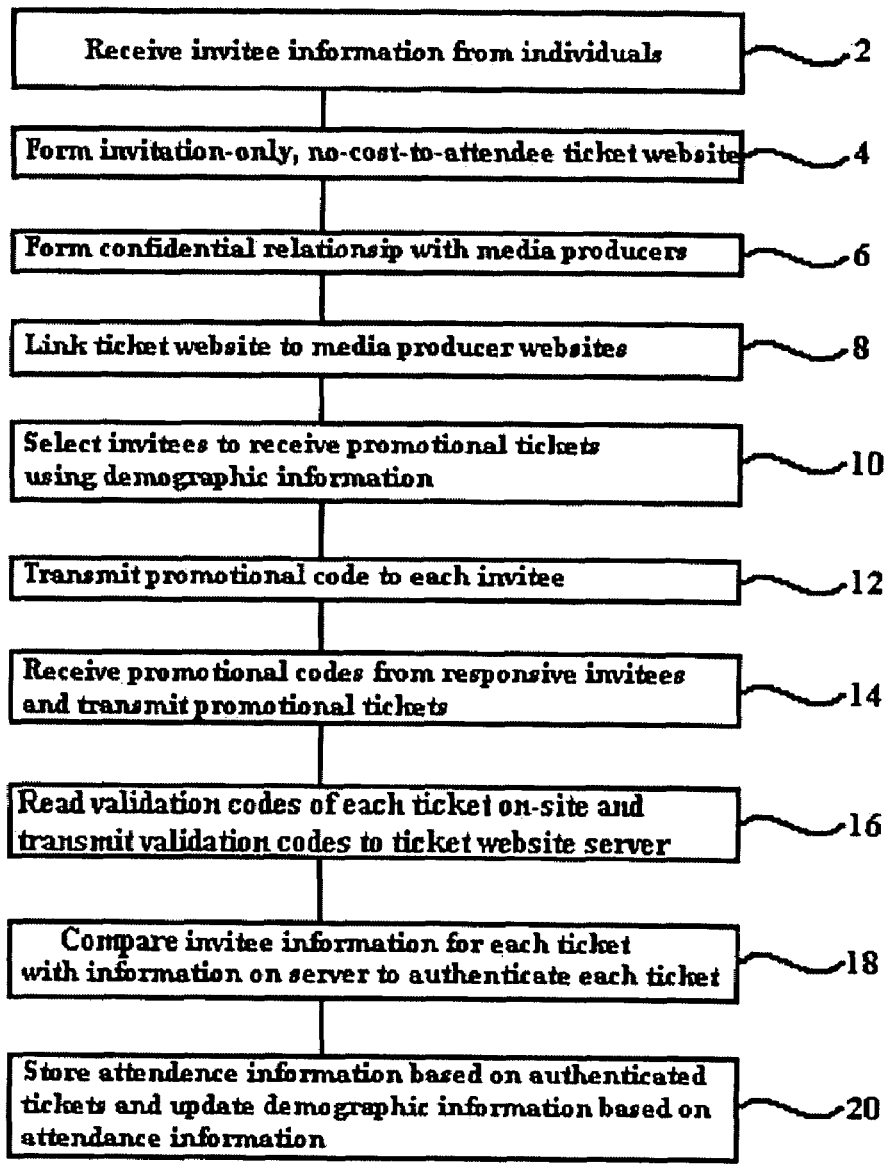
FIG. 1 is a flow chart depicting an embodiment of the present method.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a method for issuing an invitation to a show at a location and compiling demographic information.

The seamless, electronic integration of the present method provides a cheaper, faster, attractive alternative to conventional methods of promoting shows, receiving invited attendee feedback, and compiling demographic information. The present method can be used to promote a large variety of shows, such as movie screenings, television shows, concerts, theatrical events, sporting events, and other similar shows.

The present method is cost-effective and efficient, utilizing demographic information to selectively invite specific individuals to electronically access an invitation-only, no-cost-to-attendee ticket website to receive a promotional ticket. The present method thereby saves time and money that can be needlessly expended through poorly targeted physical distribution of promotional tickets.

The present method provides enhanced security through incorporation of one or more validation codes, such as bar codes, alphanumeric codes, symbol codes, security images, or other types of codes, on each promotional ticket. Validation codes can be read and transmitted at the location of the show, such as by using an electronic scanner, and compared with the each invitee's electronic information to authenticate each promotional ticket.

Validation codes can further be displayed electronically, such as on the display of an invitee's cellular telephone, palm computer, personal digital assistant, or other client device, increasing efficiency, conserving natural resources, reducing waste, and avoiding difficulties associated with lost or damaged paper tickets.

The present method further provides efficient and accurate demographic information by simultaneously tracking attendance while validating promotional tickets, using the scanned validation codes of each invited attendee.

Additionally, the present method can include linking the invitation-only, no-cost-to-attendee ticket website to the websites of one or more media providers, such as movie studios or television networks, using one or more user interfaces, to create the appearance that each promotional ticket is provided by the media provider. Through the present method, multiple media providers, promotional partners, and third parties can distribute promotional tickets using a centralized invitation-only, no-cost-to-attendee ticket website while continuing to present individualized content to invitees.

The present method begins with the step of forming an invitation-only, no-cost-to-attendee ticket website on a server. The server can be in communication, wirelessly or directly, with one or more processors and data storage media.

The invitation-only, no-cost-to-attendee ticket website includes invitee information relating to one or more individuals. Each individual's invitee information can include a name, e-mail address, address, zip code, city, state, county, gender, ethnicity, profession, marital status, veteran status, number of dependents, income, religion, level of education, attendance statistics, genre of shows attended, similar information and combinations thereof.

The invitee information can be provided by each invitee using the invitation-only, no-cost-to-attendee ticket website. Invitee information can also be provided by third parties or electronic media producers, an input administrator or third party. For example, an electronic media producer could manually or electronically input invitee information collected using surveys or forms completed by previous show attendees, or using mailed surveys or forms.

The invitation-only, no-cost-to-attendee ticket website can also include computer instructions for instructing one or more processors to generate promotional tickets for one or more invitees.

The present method also includes forming a confidential relationship with at least one electronic media producer, such as a movie studio, a movie distributor, a television studio, a television network, other similar media producers, and combinations thereof, to offer promotional tickets and to collect invitee attendance information and invited attendee feedback for shows. It is contemplated that the confidential relationship can include legal or contractual obligations or assurances to maintain invitee privacy and ensure legitimate use of demographic information.

Demographic information can be used to select the invitees to receive the promotional tickets in combination with each invitee's information. The selection of each invitee can be performed by one or more of the electronic media producers, an advertising agency, a promotional partner, one or more individuals, such as a famous movie star inviting his or her home town to view a screening of a new movie, or combinations thereof.

The selection of each invitee can also be performed electronically, such as by using computer instructions to instruct the processor to select invited attendees based on demographic information. It is also contemplated that an additional processor can be used, having computer instructions for selecting invited attendees based on a customized zip code, city, state, county, gender, ethnicity, profession, marital status, veteran status, number of dependents, income, religion, level of education, other similar information, and combinations thereof. For example, a processor could be instructed to automatically contact all males between the ages of twenty and twenty-five living in Arizona to receive a promotional ticket, or to produce a list of such individuals.

In an embodiment, selecting each invitee can include transmitting a promotional code to an invitee to access the invitation-only, no-cost-to-attendee ticket website and receive a promotional ticket. The promotional code can be any kind of code including alphanumeric strings. It is contemplated that the promotional code can include a string of characters that indicate the specific promotional partner providing the promotional ticket, such as a string of four characters within the promotional code indicating the identity of a radio station promoting the show by providing the promotional ticket. It is contemplated that the number of invited attendees that are invited by each promotional partner can be tracked using promotional codes.

The present method can include transmitting the promotional tickets from the invitation-only, no-cost-to-attendee ticket website to a client device of one or more invitees. This transmission can be a wireless transmission, such as over the internet or another network.

A client device can include, a cellular telephone, a personal digital assistant, a printer, a facsimile machine, a copier having facsimile capability, a voice over internet protocol telephone, a pager, a global positioning system, a laptop computer, a palm computer, a tablet personal computer, a watch connected to a network, a web television, or an enterprise digital assistant.

In an embodiment, the transmission of promotional tickets from invitation-only, no-cost-to-attendee ticket website to an invitee's client device can include transmitting a plurality of promotional tickets having a single validation code from the invitation-only, no-cost-to-attendee ticket website to a plurality of client devices of the invitee simultaneously, through at least two network gateway protocols. For example, two promotional tickets sharing a single validation code could be simultaneously transmitted both to an invited attendee's computer and the invited attendee's cellular telephone.

It is also contemplated that the transmission can include transmitting a plurality of promotional tickets having a single validation code from the invitation-only, no-cost-to-attendee ticket website to a plurality of client devices of the invitee simultaneously over at least two networks. For example, a first promotional ticket could be transmitted to an invitee's client device over a local area network, while a second promotional ticket could be simultaneously transmitted to the invitee's client device over the internet.

The client device is then used to display the promotional ticket. Displaying the promotional ticket can include printing the ticket, such as when using a printer or a facsimile, or graphically displaying the ticket, such as by using the display of a cellular telephone or palm computer.

It is contemplated that the promotional ticket can include invitee information, show information, show artwork, and at least one validation code.

The show information can include the title of the show, a theater name, a theater address, the time of the show, and the date of the show. It is contemplated that the show information can further include a show rating, a not for resale statement, a disclaimer, contract language, a section for notes, or combinations thereof. Show artwork can include one or more copyrighted images related to the show from one or more electronic media producers.

The one or more validation codes can include bar codes, alphanumeric codes, numeric codes, alphabetic codes, security images, such as a computer-generated series of symbols unique to each promotional ticket, or combinations thereof.

To gain access to the show, the validation code on each promotional ticket displayed using each client device is wirelessly transmitted to the server, such as by scanning a validation bar code displayed on an invitee's cellular telephone using a bar code reader, manually entering an alphanumeric code using a computer, scanning a security image using a scanner, or using other similar means. It is contemplated that the wireless transmission of the validation code can be performed using a scanner, a cellular telephone, a personal digital assistant, an enterprise data system, a computer, other similar devices, or combinations thereof.

The wireless transmission can be performed over a satellite network, a cellular network, a local area network, a wide area network, a virtual private network, the internet, or combinations thereof.

Once an invitee's validation code has been scanned, the invitee's attendance at the show can be tracked and stored, thereby changing the status of the invitee to an invited attendee.

Each validation code is then compared with the invitee information for the related invited attendee to authenticate the promotional ticket and track the attendance of each invitee.

In an embodiment, the present method can further include verifying the identity of each invitee using the invitee information on the promotional ticket and an additional identifier, such as a driver license, photographic identification, an alternate identification, a password, a RSVP list or similar checklist of invitees, or other similar identifying means.

The present method can include storing the tracked attendance and the invitee information in the data storage. The stored and tracked attendance and the stored invitee information can be used for compiling demographic information for selecting future invitees.

In an embodiment, the present method can include receiving feedback for the show, such as comments or reviews, from one or more invited attendees. The feedback can be provided to one or more electronic media producers. The feedback can also be stored and used to compile demographic information for future use when selecting invitees.

It is contemplated that the present method can also include generating one or more reports using the demographic information, the invitee information, the show information, the tracked attendance, or combinations thereof. The report can also include invited attendee comments and feedback, the show rating, attendance statistics, genre of shows attended, and combinations thereof. The report can further include promotional partner ticket distribution success and invitee attendance per show, which can include the number of promotional tickets distributed by a promotional partner and the number of invitees receiving promotional tickets that attended the show.

In an embodiment, the invitation-only, no-cost-to-attendee ticket website can appear as a website of an electronic media producer, a promotional partner, or combinations thereof. For example, a website of a promotional partner, such as a radio station, a coffee shop, a chamber of commerce, a travel agency, an airline, an advertising partner of a cinema, a law firm, an equipment manufacturer or distributor, or any other third party can invisibly link to the invitation-only, no-cost-to-attendee ticket website. An invitee can receive a promotional ticket transmitted from the invitation-only, no-cost-to-attendee ticket website to the promotional partner website, then transmitted to a client device of the invitee, thereby creating the appearance that the promotional ticket has been provided by the promotional partner.

Referring now to FIG. 1, a flow chart showing an embodiment of the present method is depicted.

The depicted embodiment begins with the step of receiving invitee information from individuals (2). It is contemplated that the invitee information can be provided from the invitee, such as by connecting to the invitation-only, no-cost-to-attendee ticket website and providing requested information. Invitee information can also be provided by or imputed by third parties, such as electronic media producers.

The invitation-only, no-cost-to-attendee ticket website is then formed (4). The invitation-only, no-cost-to-attendee ticket website can be resident on a server having one or more processors and data storage media. The data storage can include any computer instructions necessary to instruct the processor to store invitee information, permit modification of invitee information, transmit promotional tickets and promotional codes, receive promotional codes, receive validation codes, compare invitee information to authenticate promotional tickets, store attendance information, and other similar functions, such as permitting access to the invitation-only, no-cost-to-attendee ticket website and linking the invitation-only, no-cost-to-attendee ticket website with other websites. The data storage can also include any stored invitee information, demographic information, or attendance information.

The depicted embodiment then includes forming a confidential relationship with electronic media producers (6). The confidential relationship can include agreements to securely maintain the confidentiality of any demographic information or invitee information, customer lists, business methods, and similar information. The confidential relationship can also include agreements to link the invitation-only, no-cost-to-attendee ticket website to one or more third party websites, or to incorporate the use of sufficient user interfaces to transmit tickets from the ticket website to third party websites so that invitees can obtain tickets through third party websites.

The invitation-only, no-cost-to-attendee ticket website can then be linked with one or more media producer websites (8). It is contemplated that this step can be optional, and that the invitation-only, no-cost-to-attendee ticket website can also be connected directly by the invitees.

Any third party website can be linked to the invitation-only, no-cost-to-attendee ticket website, and the invitation-only, no-cost-to-attendee ticket website can be linked to create the appearance that a promotional ticket is being provided to an invited attendee by a third party, such as an electronic media producer. For example, a promotional code can be sent from the invitation-only, no-cost-to-attendee ticket website to a third party website, then to an invitee, who can connect to the third party website and enter the promotional code, which can be transmitted to the invitation-only, no-cost-to-attendee ticket website. A promotional ticket can then be transmitted from the invitation-only, no-cost-to-attendee ticket website to the third party website, where the invitee can access and display the promotional ticket.

The depicted embodiment can then include selecting invitees to receive promotional tickets using demographic information (10). Any type of demographic information, such as location, level of education, level of income, gender, ethnicity, religion, age, or previously attended shows can be used when selecting invited attendees. For example, a media producer may attempt to target all individuals between the ages of 20 and 25 within the state of Ohio, and select individuals whose invitee information corresponds to this target demographic. The selection of invitees can be performed automatically, using computerized means, or the selection can be performed manually.

After selecting invitees, a promotional code can be sent to each invitee (12). Promotional codes can be any kind of code, and can be accompanied by instructions to connect to the ticket website or a third party website. The instructions can further direct the invitee or third party to input the promotional code.

The promotional codes are received from responsive invitees, and promotional tickets are transmitted to each responsive invitee (14). The invitation-only, no-cost-to-attendee ticket website can receive the promotional codes directly from connected invitees, or through a third party website. The promotional ticket can be transmitted directly to an invitee, such as by e-mailing the promotional ticket to an invitee's e-mail address, or the promotional ticket can be transmitted to a third party website to be accessed by an invitee.

It is contemplated that the use of promotional codes can be omitted, and a promotional ticket can instead be sent directly to each invitee, or made accessible to each invitee, such as by connecting to a website to access the promotional ticket, after each invitee has been selected using demographic information.

At the location of the show, the validation code for each promotional ticket is read and transmitted to the ticket website server (16). This step can be performed using a scanner or similar means for reading the validation code, or by manually inputting each validation code, such as by using an on-site computer in wireless or direct communication with the ticket website server.

The ticket website server then compares each read validation code with the associated invitee information on the server to authenticate each promotional ticket (18). Simultaneously or sequentially, the ticket website server can track and store attendance information based on the authenticated promotional tickets and use this attendance information to update the server demographic information for future invitee selection (20).

Figure 2:
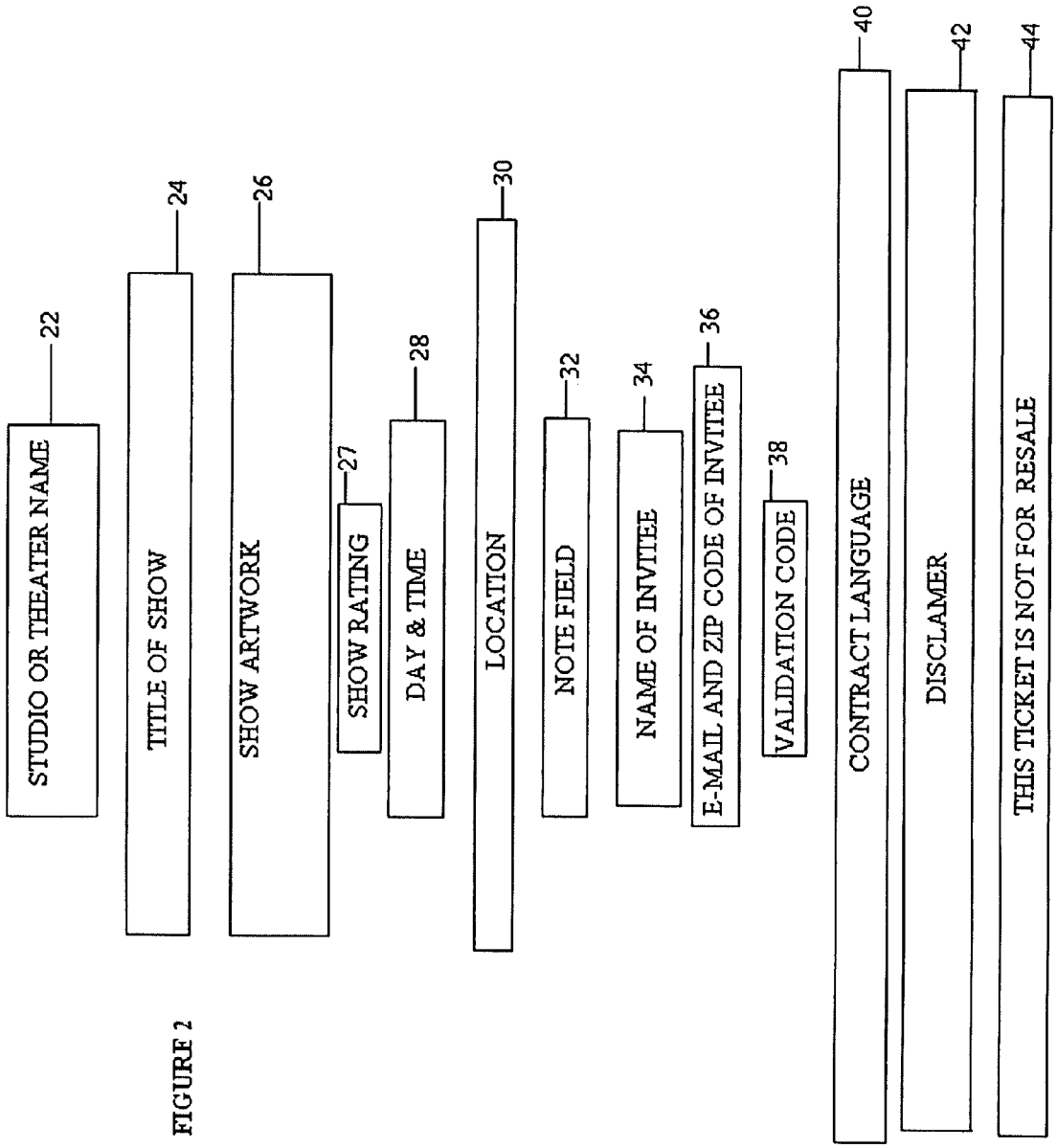
FIG. 2 depicts an embodiment of a promotional ticket.

FIG. 2 depicts an embodiment of a promotional ticket that can be displayed by an invitee using a client device. The promotional ticket can be physically printed, such as when using a printer or a facsimile, or the promotional ticket can be electronically displayed, such as by using a cellular telephone, palm computer, or personal digital assistant.

The promotional ticket can include a studio or theater name (22), which can identify the name of the location at which a show will take place, such as Cinemark or Edward's Theater. The promotional ticket can also include similar show information, including the title of the show (24), such as "Spiderman 3," and related show artwork (26), which can include any number of copyrighted images used by an electronic media producer to promote a show.

The depicted promotional ticket can further include the show rating (27), such as Rated-R, the day and time (28) of the show, such as Friday, Jul. 6, 2007, 2:00 P.M., and the location of the show (30), such as 2949 Dunvale, Houston, Tex. 77063.

The depicted promotional ticket can also include a note field (32) for special notes or announcements, such as "Wear a costume to the screening and receive a special prize."

The promotional ticket can also include invitee information, such as the name of the invitee (34). The depicted embodiment of the promotional ticket also includes the e-mail address and zip code of the invitee (36).

The promotional ticket also includes a validation code (38), which can be a bar code, an alphanumeric code, a security image, or any other type of code that can be read at the location of the show to authenticate the promotional ticket. It is contemplated that use of the validation code (38) can prevent fraudulent use or duplication of promotional tickets.

The depicted promotional ticket can also include contract language (40), such as "This screening will be monitored for unauthorized recording. By attending, you agree not to bring any audio or video recording devices into the theater and consent to a physical search of your belongings and person. Any attempted use of recording devices will result in immediate removal from the theater, forfeiture, and may subject you to criminal and civil liability."

A disclaimer (42) can also be included, such as, "Theater is overbooked to ensure a full house. Seating is first come first served. This pass does not guarantee admission and must be surrendered upon demand. No one will be admitted without a ticket or after the screening begins. Theater is not responsible for overbooking. This pass is the property of New Line who reserves the right to refuse, revoke, or limit admission at the discretion of an authorized studio and/or theater representative at any time."

The promotional ticket can also include a "not for resale" statement (44).

Figure 3:
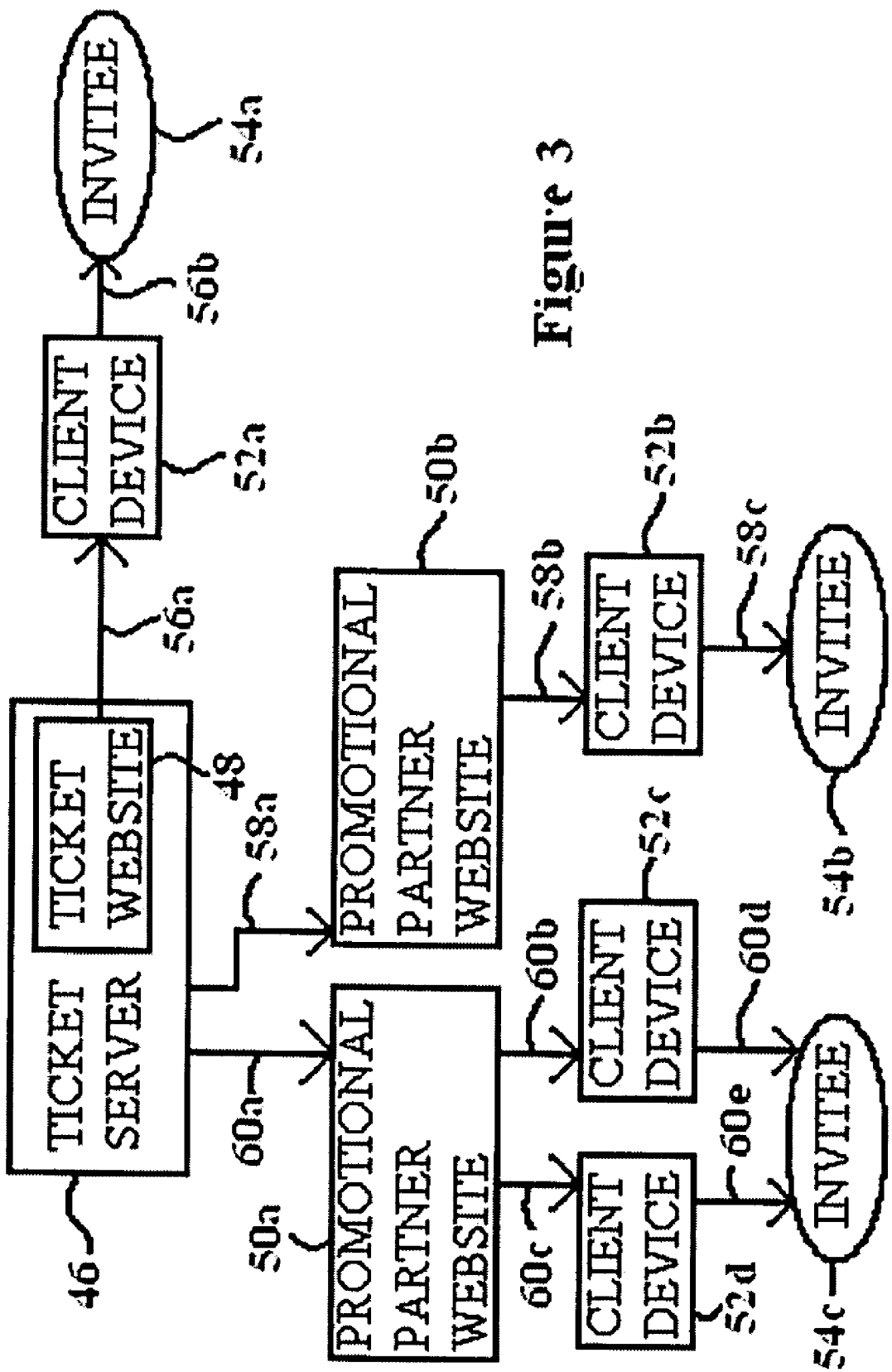
FIG. 3 depicts an embodiment of a system useable with the present method.

FIG. 3 is a schematic depiction of a system useable with the present method. FIG. 3 depicts the invitation-only, no-cost-to-attendee ticket website (48) resident on a ticket server (46). Ticket server (46) can be any kind of server with data storage, or multiple servers, in communication with a network, such as the internet.

First promotional partner website (50a) and second promotional partner website (50b) are depicted in communication with ticket server (46), such that codes and tickets can be transmitted between ticket server (46) and promotional partner websites (50a and 50b). First promotional partner website (50a) and second promotional partner website (50b) can be resident on ticket server (46), separate servers, or other locations proximate to or remote from ticket server (46), and in communication with ticket server (46) via a network.

A first invitee (54a) is shown with a first client device (52a), which can be any type of client device having a printer or a display. First client device (52a) is in communication with ticket website (48) on ticket server (46). A first ticket (56a) is shown being transmitted from ticket website (48) to first client device (52a). The first ticket (56b) is then printed or displayed by first client device (52a) such that first ticket (56b) can be accessed by first invitee (54a).

A second invitee (54b) is shown with a second client device (52b), which can be substantially similar to first client device (52a), or a different type of client device having a printer or a display. Second client device (52b) is in communication with second promotional partner website (50b). A second ticket (58a) is shown being transmitted from ticket server (46) to second promotional partner website (50b). The second ticket (58b) is then shown being transmitted from second promotional partner website (50b) to second client device (52b). The second ticket (58c) can then be printed or displayed by second client device (52b), enabling second ticket (58c) to be accessed by second invitee (54b).

A third invitee (54c) is shown having a third client device (52c) and a fourth client device (52d). It is contemplated that third client device (52c) and fourth client device (52d) can be different kinds of client devices, such as third invitee (54c) having a computer with a printer and a personal digital assistant, both in communication with first promotional partner website (50a) via a network. A third ticket (60a) is transmitted from ticket server (46) to first promotional partner website (50a). Third ticket (60b and 60c) is then simultaneously transmitted from first promotional partner website (50a) to both third client device (52c) and fourth client device (52d). It is contemplated that both transmissions of third ticket (60b and 60c) share identical validations codes, such that only one invitee can be admitted using third ticket (60d and 60e).

Third ticket (60d) can then be printed or displayed by third client device (52c) and accessed by third invitee (54c). Alternatively, third ticket (60e) can also be printed or displayed by fourth client device (52d) and accessed by third invitee (54c).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for issuing an invitation to a show at a location and compiling demographic information comprising the steps of:
   forming an invitation-only, no-cost-to-attendee ticket website on a server in communication with a processor and data storage comprising invitee information and computer instructions for instructing the processor to generate at least one promotional ticket for at least one invitee;
   forming a confidential relationship with at least one electronic media producer to offer promotional tickets and collect invitee attendance information and invited attendee feedback for shows;
   using demographic information to select the at least one invitee to receive the at least one promotional ticket;
   transmitting the at least one promotional ticket from the invitation-only, no-cost-to-attendee ticket website to a client device of the at least one invitee;
   using the client device to display the at least one promotional ticket by the at least one invitee, wherein the at least one promotional ticket comprises invitee information, show information, show artwork, and at least one validation code;
   wirelessly transmitting the at least one validation code displayed using the client device at the location to the server, thereby changing the at least one invitee to at least one invited attendee;
   comparing the at least one validation code with the invitee information for the at least one invited attendee to authenticate the at least one promotional ticket and track attendance by the at least one invitee; and
   storing the tracked attendance and the invitee information in the data storage.

2. The method of claim 1, wherein the step of selecting the at least one invitee to receive the at least one promotional ticket is performed by the at least one electronic media producer, a movie studio, an advertising agency, a promotional partner, an individual, the at least one processor using computer instructions to select invitees using the demographic information, an additional processor having computer instructions for selecting invitees based on a customized zip code, city, state, county, gender, ethnicity, profession, marital status, veteran status, number of dependents, income, religion, level of education, and combinations thereof.

3. The method of claim 1, wherein the step of using demographic information to select the at least one invitee to receive the at least one promotional ticket further comprises transmitting a promotional code to the at least one invitee to access the invitation-only, no-cost-to-attendee ticket website and receive the at least one promotional ticket.

4. The method of claim 3, wherein the promotional code comprises at least four characters to indicate a specific promotional partner.

5. The method of claim 1, wherein the step of transmitting the at least one promotional ticket from the ticket website to a client device of the at least one invitee is a wireless transmission.

6. The method of claim 1, wherein the step of wirelessly transmitting the at least one validation code displayed using the client device to the server is performed over a satellite network, a cellular network, a local area network, a wide area network, a virtual private network, the internet, or combinations thereof.

7. The method of claim 1, wherein the client device is a cellular telephone, a personal digital assistant, a printer, a facsimile machine, a copier having facsimile capability, a voice over internet protocol telephone, a pager, a global positioning system, a laptop computer, a palm computer, a tablet personal computer, a watch connected to a network, a web television, or an enterprise digital assistant.

8. The method of claim 1, wherein the invitee information comprises name, e-mail address, zip code, city, state, county, gender, ethnicity, profession, marital status, veteran status, number of dependents, income, religion, level of education, attendance statistics, genre of shows attended, and combinations thereof.

9. The method of claim 1, wherein the at least one electronic media producer is a member of the group consisting of: at least one movie studio, at least one movie distributor, at least one television studio, at least one television network, or combinations thereof.

10. The method of claim 1, wherein the stored tracked attendance and the stored invitee information are used for compiling the demographic information for selecting future invitees.

11. The method of claim 1, wherein the at least one validation code is a bar code, an alphanumeric code, a numeric code, an alphabetic code, a security image, or combinations thereof.

12. The method of claim 1, wherein the wireless transmitting of the at least one validation code to the server is performed using a member of the group consisting of: a scanner, a cellular telephone, a personal digital assistant, an enterprise data system, a computer, or combinations thereof.

13. The method of claim 1, wherein the show information comprises title of show, theater name, theater address, time of show, and date of show.

14. The method of claim 13, wherein the show information further comprises show rating, a not for resale statement, a disclaimer, contract language, a section for notes, or combinations thereof.

15. The method of claim 1, further comprising the step of receiving feedback for the show from the at least one invited attendee.

16. The method of claim 1, further comprising the step of receiving invitee information from the at least one invitee using the invitation-only, no-cost-to-attendee ticket website.

17. The method of claim 1, further comprising the step of verifying the identity of the at least one invitee at the location using the invitee information and an additional identifier.

18. The method of claim 1, further comprising the step of generating at least one report using the demographic information, the invitee information, the show information, or combinations thereof.

19. The method of claim 1, wherein the invitation-only, no-cost-to-attendee ticket website appears as a website of the at least one electronic media producer, promotional partner, or combinations thereof.

20. The method of claim 1, wherein the step of transmitting the at least one promotional ticket from the invitation-only, no-cost-to-attendee ticket website to a client device of the at least one invitee comprises transmitting a plurality of promotional tickets comprising a single validation code from the invitation-only, no-cost-to-attendee ticket website to a plurality of client devices of the at least one invitee simultaneously through at least two network gateway protocols.

21. The method of claim 1, wherein the step of transmitting the at least one promotional ticket from the invitation-only, no-cost-to-attendee ticket website to a client device of the at least one invitee comprises transmitting a plurality of promotional tickets comprising a single validation code from the invitation-only, no-cost-to-attendee ticket website to a plurality of client devices of the at least one invitee simultaneously over at least two networks.

* * * * *